US006954223B2

(12) United States Patent
Miyazawa et al.

(10) Patent No.: US 6,954,223 B2
(45) Date of Patent: Oct. 11, 2005

(54) STEREOSCOPIC IMAGE GENERATING APPARATUS AND GAME APPARATUS

(75) Inventors: Atsushi Miyazawa, Kawasaki (JP); Masaaki Hanada, Yokohama (JP); Katsuki Itami, Kawasaki (JP); Motonaga Ishii, Yokohama (JP)

(73) Assignee: NAMCO Ltd., Tokyo (JP)

( * ) Notice: Subject to any disclaimer, the term of this patent is extended or adjusted under 35 U.S.C. 154(b) by 675 days.

(21) Appl. No.: 10/031,746

(22) PCT Filed: Aug. 15, 2001

(86) PCT No.: PCT/JP01/07026

§ 371 (c)(1), (2), (4) Date: Jan. 24, 2002

(65) Prior Publication Data

US 2002/0105576 A1 Aug. 8, 2002

(30) Foreign Application Priority Data

Aug. 25, 2000 (JP) ....................................... 2000-256049

(51) Int. Cl.[7] .................................................. H04N 7/18
(52) U.S. Cl. ......................................................... 348/51
(58) Field of Search ........................ 348/51, 42, 47–48, 348/59, 53; 345/6, 419; 359/462, 475; 382/154; 463/32–33

(56) References Cited

U.S. PATENT DOCUMENTS 5,614,941 A * 3/1997 Hines .......................... 348/42
6,061,083 A * 5/2000 Aritake et al. ................ 348/51
6,064,424 A * 5/2000 van Berkel et al. ........... 348/59
6,069,650 A * 5/2000 Battersby ..................... 348/59
6,084,978 A * 7/2000 Taylor et al. ............... 382/154
6,573,928 B1 * 6/2003 Jones et al. ................... 348/51
6,801,243 B1 * 10/2004 Van Berkel .................. 348/59

FOREIGN PATENT DOCUMENTS

JP A 11-27607 1/1999
JP 11-027607 * 1/1999 ............ H04N/5/72

* cited by examiner

*Primary Examiner*—Vu Le
(74) *Attorney, Agent, or Firm*—Oliff & Berridge, PLC

(57) ABSTRACT

A stereoscopic image generating apparatus for generating stereoscopic images to be displayed on a n-eye type of stereoscopic image display apparatus, for every frame, and displaying dynamic images on the stereoscopic image display apparatus, and a game apparatus comprising the stereoscopic image generating apparatus. A stereoscopic image generating apparatus 10 comprises: an input image storage memory 20 comprising storage areas corresponding to n viewing images inputted from an outside for every frame, respectively; and an interleaver 30 for interleaving the viewing images in parallel by reading out image data to be sampled of the viewing images from predetermined storage addresses of the input image storage memory, and generating a stereoscopic image to be displayed on a n-eye type of stereoscopic image display apparatus.

6 Claims, 7 Drawing Sheets

STEREOSCOPIC IMAGE GENERATING APPARATUS AND GAME APPARATUS

TECHNICAL FIELD

The present invention relates to a stereoscopic image generating apparatus for generating stereoscopic images to be displayed on a n-eye type of stereoscopic image display apparatus, for every frame, and a game apparatus comprising the stereoscopic image generating apparatus.

BACKGROUND ART

In recent years, developments in stereoscopic image display apparatuses wherein images are seen so as to stand out from screens thereof have been advanced. The stereoscopic image is achievable by voluntarily generating both eyes parallax caused by an interval between a right eye and a left eye. That is, the stereoscopic image display apparatus provides different images to a right eye and a left eye of a person who watches images, and thereby expresses a stereoscopic sense that is images are viewed so as to stand out. As the method of providing the both eyes parallax, a Lenticular system or a Parallax Barrier system has been known.

In case the stereoscopic display apparatus is a n-eye type, the stereoscopic image to be displayed on the stereoscopic image display apparatus is composed of n-eye images, that is images viewed from n predetermined directions, and thereby generated. The stereoscopic image generation algorithm is a technique which is well known in "3D Image-Processing Algorithms that Take Account of a Lenticular Array's Sampling Effect (3D Image Conference 1996)" or the like, so that the explanation thereof will be omitted.

The above-described stereoscopic image generating algorithm is one of algorithms for generating a stereoscopic image on the basis of a predetermined static image without adhering to the concept of time. Accordingly, it is possible to put the algorithm achievable of the display of dynamic images expressed in the time-continuous display of a plurality of stereoscopic images generated for every frame, that is, frame after frame, at a real time, such as so-called cartoons which are leafed, to practical only by various types of inventions.

Whether the stereoscopic image display apparatus can generate and display the dynamic images at a real time or not depends on the following proposition. That is, it depends on whether the stereoscopic image generating apparatus can generate the stereoscopic images for every frame, that is, frame after frame, time-continuously, or not. More specifically, in case the stereoscopic image generating apparatus has a construction of performing the stereoscopic image generating algorithm only as a software processing, because the frequency of accesses by the stereoscopic image generating apparatus to n-eye original images of each frame becomes high, when the stereoscopic image generating apparatus generates stereoscopic images, there is a possibility it is prevented that the stereoscopic image generating apparatus generates stereoscopic images for every frame, or all n-eye original images are not completed.

Further, because it is necessary that a game apparatus, a three-dimensional CAD system or the like, comprising the stereoscopic image generating apparatus generates not only stereoscopic images but also n-eye original images, it is rigidly restricted on time.

It is an object of the present invention to provide a stereoscopic image generating apparatus for generating stereoscopic images to be displayed on a n-eye type of stereoscopic image display apparatus, for every frame, and displaying dynamic images on the stereoscopic image display apparatus, and a game apparatus comprising the stereoscopic image generating apparatus.

DISCLOSURE OF THE INVENTION

In accordance with a first aspect of the present invention, a stereoscopic image generating apparatus (for example, a stereoscopic image generating apparatus 10 shown in FIG. 3) comprises: an input image storage memory (for example, an original image storage unit 20 shown in FIG. 3) comprising storage areas corresponding to n viewing images (for example, original images 90 shown in FIG. 3) inputted from an outside for every frame, respectively; and an interleaver (for example, an interleaver 30 shown in FIG. 3) for interleaving the viewing images in parallel by reading out image data to be sampled of the viewing images from predetermined storage addresses of the input image storage memory, and generating a stereoscopic image to be displayed on a n-eye type of stereoscopic image display apparatus.

Herein, the n viewing images means n images of one object viewed from n directions. For example, four viewing images are images generated on the basis of one object viewed from a far left direction, a left direction, a right direction and a far right direction, or the like. Further, the fact the n viewing images are inputted to the input image storage memory for every frame means that n viewing images are collectively inputted to the input image storage memory for every frame time-continuously. Further, each viewing image is stored in a specified storage address of the input image storage memory, and thereby the parallel interleave to the viewing images is realizable. That is, for example, concerning the specified viewing image, in case the viewing image and the stereoscopic image are color images addresses in which image data of the specified sub pixel, that is, color data of the sub pixel are stored, and in case the viewing image and the stereoscopic image are black and white color images addresses in which image data of the specified pixel, that is, color data of the pixel are stored, are always fixed those. Therefore, the sampling when the viewing images are interleaved, can be performed by mechanically reading out image data, that is, color data from addresses as an object of sampling, and the interleaver which is a H/W circuit can easily realize the sampling, and further the interleaving by using a fetch or the like.

According to the stereoscopic image generating apparatus of the above-described first aspect of the present invention, because it is possible to realize storing n viewing images and interleaving n viewing images like an assembly-line operation, it is possible to lower the frequency of access to the memory. Further, because the stereoscopic image generating apparatus has a H/W construction comprising the memory for storing viewing images therein and the interleaver only for interleaving the viewing images, it is possible to realize the higher-speed processing in comparison with the case the S/W interleaves viewing images.

In accordance with a second aspect of the present invention, a stereoscopic image generating apparatus (for example, a stereoscopic image generating apparatus 210 shown in FIG. 5) comprises: a frame buffer (for example, a frame buffer 220 shown in FIG. 5) for storing a frame of stereoscopic images therein; and an interleaver (for example, an interleaver 230 shown in FIG. 5), when n viewing images are inputted from an outside for every frame in serial order, for interleaving stereoscopic images stored in the frame buffer with viewing images inputted, restoring the stereoscopic images, and generating a stereoscopic image to be displayed on a n-eye type of stereoscopic image display apparatus.

Herein, the fact the n viewing images are inputted to the interleaver for every frame in serial order means that the n viewing images are shifted from each other in time and inputted to the interleaver for every frame.

According to the stereoscopic image generating apparatus of the above-described second aspect of the present invention, it is possible to generate the stereoscopic image by interleaving the inputted viewing images in order of input to the interleaver even if all n viewing images are not completed. Consequently, the side of generating viewing images (for example, an image generation unit 114 shown in FIG. 5) can output the generated viewing images to the stereoscopic image generating apparatus in order, and the stereoscopic image generating apparatus can save the waiting time until all viewing images are inputted and completed. Further, because it is unnecessary that the stereoscopic image generating apparatus stores all n viewing images therein, it is possible to reduce the memory capacity constituting the apparatus.

In accordance with a third aspect of the present invention, a game apparatus (for example, a game apparatus 100 shown in FIG. 4) comprising the stereoscopic image generating apparatus of the first aspect of the present invention and a n-eye type of stereoscopic image display apparatus (for example, a display unit 40 shown in FIG. 4), further comprises: a game image generating section (for example, an image generation unit 114 shown in FIG. 4) for generating game images corresponding to n viewpoints for every frame; and a game operating section (for example, a game operation unit 112 shown in FIG. 4) for operating a stereoscopic dynamic image game by making the stereoscopic image generating apparatus generate a stereoscopic image on the basis of the game images, and by making the stereoscopic image display apparatus display the stereoscopic image thereon.

In accordance with a fourth aspect of the present invention, a game apparatus (for example, a game apparatus 200 shown in FIG. 5) comprising the stereoscopic image generating apparatus of the second aspect of the present invention and a n-eye type of stereoscopic image display apparatus (for example, a display unit 40 shown in FIG. 5), further comprises: a game image generating section (for example, an image generation unit 114 shown in FIG. 5) for generating game images corresponding to n viewpoints for every frame; and a game operating section (for example, a CPU 110 shown in FIG. 5) for operating a stereoscopic dynamic image game by making the stereoscopic image generating apparatus generate a stereoscopic image on the basis of the game images, and by making the stereoscopic image display apparatus display the stereoscopic image thereon.

According to the game apparatus of the above-described third or fourth aspect of the present invention, because it is enough that the stereoscopic image generating apparatus generates the stereoscopic image and the game apparatus operates the game and generates the game images, it is possible to distribute and perform the processes in parallel. Further, because the game apparatus supplies game images to the stereoscopic image generating apparatus stably, it is possible that the stereoscopic image generating apparatus generates the stereoscopic image at the stable speed.

The game apparatus may be any one of a portable game machine, a consumer game machine, and an arcade game machine. Further, as the system of the stereoscopic image display apparatus, for example, a Lenticular system or a Parallax Barrier system can be given, and it may be any of them.

PREFERRED EMBODIMENT OF THE INVENTION

Hereinafter, a preferred embodiment of the present invention will be explained with reference to figures, in detail.

Although it will be explained that a stereoscopic image generating apparatus is a four-eye type of Lenticular system of color display apparatus according to the embodiment, the present invention is not limited to the embodiment.

Figure 1:
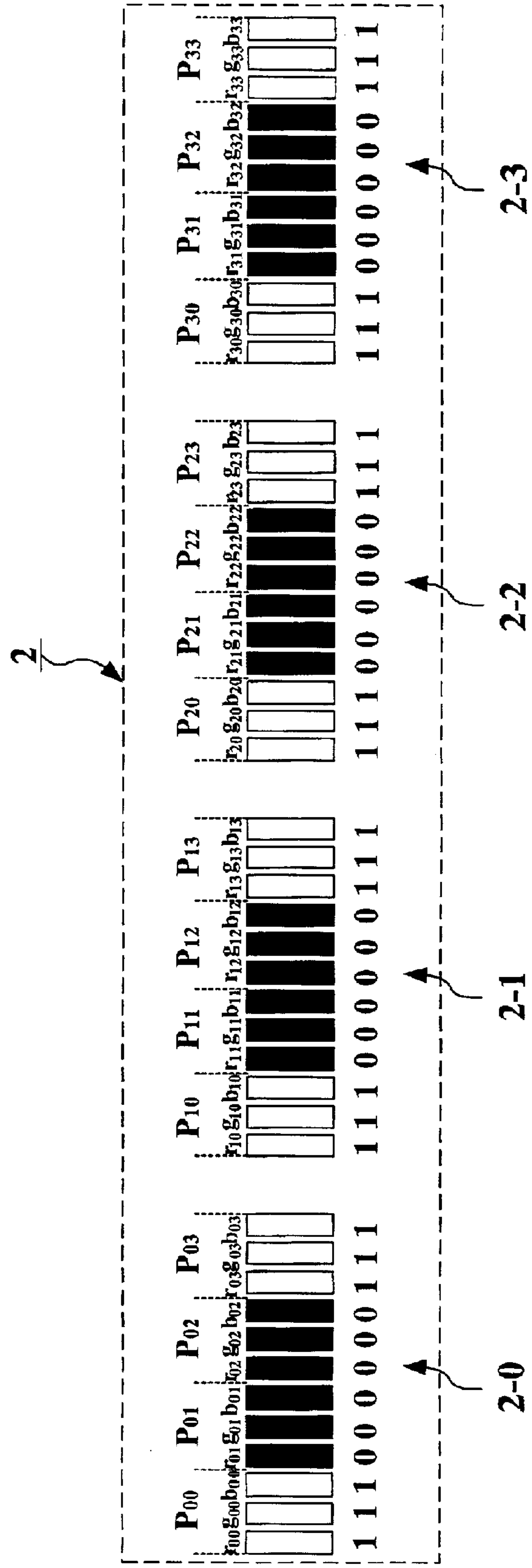
FIG. 1 is a view for explaining an interleave as a performing principle of an interleaver of a stereoscopic image generating apparatus.

First, an interleaver of the stereoscopic image generating apparatus according to the embodiment will be simply explained with reference to FIG. 1. FIG. 1 is a view for simply explaining a performing principle of the interleaver, that is, an interleaving.

As shown in FIG. 1, the interleaver according to the embodiment is a sub pixel interleaver for arranging specific sub pixels of rgb (red, green, blue) sub pixels showing brightness of pixels of images (Hereinafter, they will be called original images.) 2 viewed from a plurality of different view points, for every rgb sub pixel, in order, to generate an image for a stereoscope, that is, an image (Hereinafter, it will be called a composed image.) displayed as a stereoscopic image through a Lenticular Screen "L". Generally, although the images viewed from a plurality of different view points are different from each other, in FIG. 1, in order to simplify the explanation all images viewed from the different view points will be the same.

Further, in FIG. 1, because the stereoscopic image generating apparatus according to the embodiment is a four-eye type, the original image 2 includes four original images that are a far left original image 2-0, a left original image 2-1, a right original image 2-2, and a far right original image 2-3. Therefore, the interleaver generates the composed image based on specific sub pixels of sub pixels $r_{00}$ to $b_{33}$ constituting pixels $P_{00}$ to $P_{33}$ of four original images 2-0 to 2-3.

Further, in case the stereoscopic image generating 3 apparatus is a four-eye type, the stereoscopic image generating apparatus interleaves the original images 2-0 to 2-3 for every four pixels continuously, and thereby generates the whole composed image. Therefore, in FIG. 1, in order to simplify the explanation, regarding the original images 2-0, 2-1, 2-2 and 2-3, only four pixels of $P_{00}$ to $P_{03}$, $P_{10}$ to $P_{13}$, $P_{20}$ to $P_{23}$, and $P_{30}$ to $P_{33}$ are shown respectively. Furthermore, in order to simplify the following explanation, regarding the original images 2-0 to 2-3, only four pixels will be explained as an object respectively.

Therefore, the far left original image 2-0 is composed of a pixel $P_{00}$ comprising sub pixels $r_{00}$, $g_{00}$ and $b_{00}$, a pixel $P_{01}$ comprising sub pixels $r_{01}$, $g_{01}$, and $b_{01}$, a pixel $P_{02}$ comprising sub pixels $r_{02}$, $g_{02}$ and $b_{02}$, and a pixel $P_{03}$ comprising sub pixels $r_{03}$, $g_{03}$ and $b_{03}$. As well, the left original image 2-1 is composed of pixels $P_{10}$ to $P_{13}$ comprising sub pixels $r_{10}$, $g_{10}$ and $b_{10}$ to $r_{13}$, $g_{13}$ and $b_{13}$, the right original image 2-2 is composed of pixels $P_{20}$ to $P_{23}$ comprising sub pixels $r_{20}$, $g_{20}$ and $b_{20}$ to $r_{23}$, $g_{23}$ and $b_{23}$, and the far right original image 2-3 is composed of pixels $P_{30}$ to $P_{33}$ comprising sub pixels $r_{30}$, $g_{30}$ and $b_{30}$ to $r_{33}$, $g_{33}$ and $b_{33}$.

Figure 2:
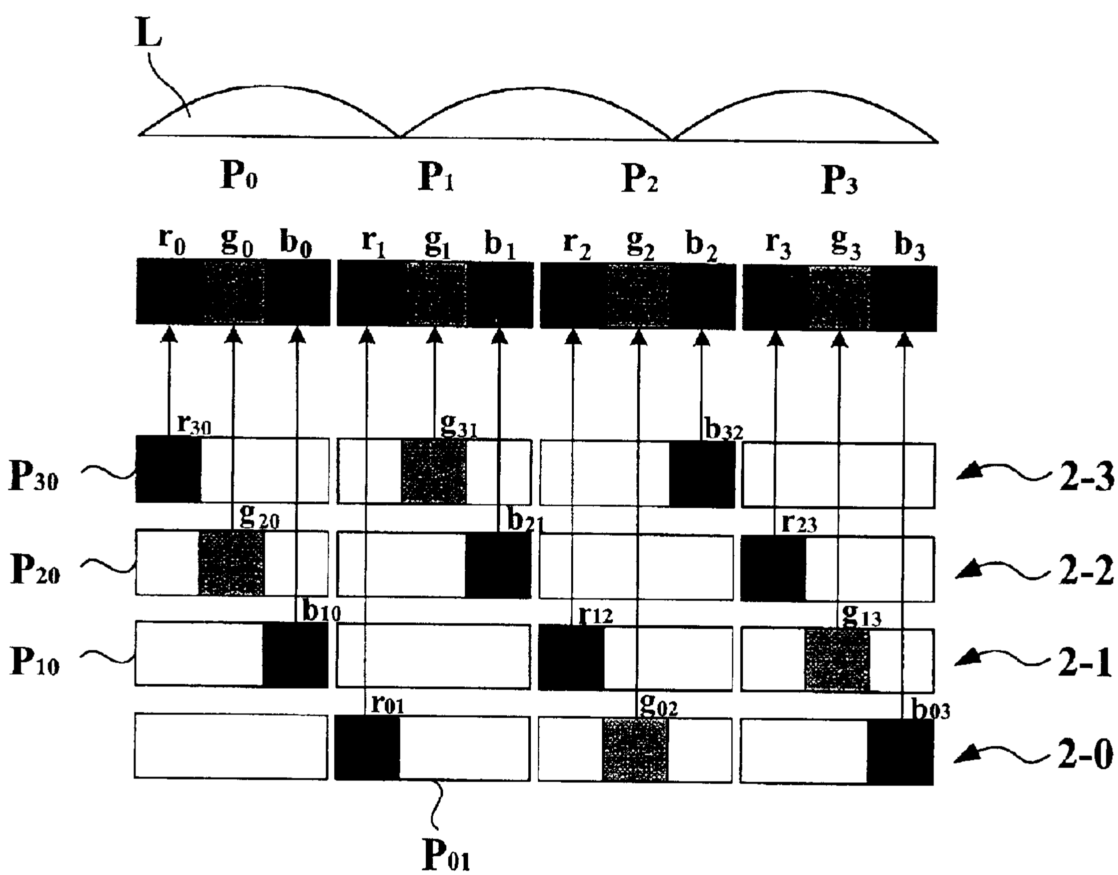
FIG. 2 is a view for explaining the interleave by a direct sampling.

Various algorithms are designed as an algorithm for the stereoscopic image generating apparatus of generating the composed image based on a plurality of original images. According to the embodiment, the stereoscopic image generating apparatus may carry out any one of various algorithms. Herein, the direct sampling known as the simplest algorithm will be simply explained with reference to FIG. 2. FIG. 2 is a view for explaining the interleave by the direct sampling.

As shown in FIG. 2, the direct sampling is an algorithm of selecting each sub pixel of original images corresponding to each sub pixel (Hereinafter, it will be called a composed image sub pixel.) of the composed image, and determining the brightness of the selected sub pixel to be the brightness of the composed image sub pixel. More specifically, according to the direct sampling, each of the composed image sub pixels $r_0$, $g_0$ and $b_0$ to $r_3$, $g_3$ and $b_3$ included in four composed image pixel $P_0$, $P_1$, $P_2$ and $P_3$ is determined on the brightness of sub pixels of the far right original image 2-3, the right original image 2-2, the left original image 2-1 and the far left original image 2-0, in order. That is, the brightness of the composed image sub pixel $r_0$ is determined on the basis of the sub pixel $r_{30}$ of the far right original image 2-3, the brightness of the composed image sub pixel $g_0$ is determined on the basis of the sub pixel $g_{20}$ of the right original image 2-2, the brightness of the composed image sub pixel $b_0$ is determined on the basis of the sub pixel $b_{10}$ of the left original image 2-1, and the brightness of the composed image sub pixel $r_1$ is determined on the basis of the sub pixel $r_{01}$ of the far left original image 2-0. As well, the brightness of the composed image sub pixels $g_1$, $b_1$, $r_2$, $g_2$, $b_2$, $r_3$, $g_3$, and $b_3$ are determined on the basis of the sub pixel $g_{31}$ of the far right original image 2-3, the sub pixel $b_{21}$ of the right original image 2-2, the sub pixel $r_{12}$ of the left original image 2-1, the sub pixel $g_{02}$ of the far left original image 2-0, the sub pixel $b_{32}$ of the far right original image 2-3, the sub pixel $r_{23}$ of the right original image 2-2, the sub pixel $g_{13}$ of the left original image 2-1, the sub pixel $b_{03}$ of the far left original image 2-0, respectively.

As described above, when the stereoscopic image generating apparatus generates the composed image, it has been known the brightness of which of sub pixels of the original images corresponds to each sub pixel of the composed images. Accordingly, it is possible that the stereoscopic image generating apparatus of the present invention generates the stereoscopic image with higher speed, by using the above-effect.

Hereinafter, two embodiments to which the stereoscopic image generating apparatus of the present invention is applied will be explained.

First Embodiment

Figure 3:
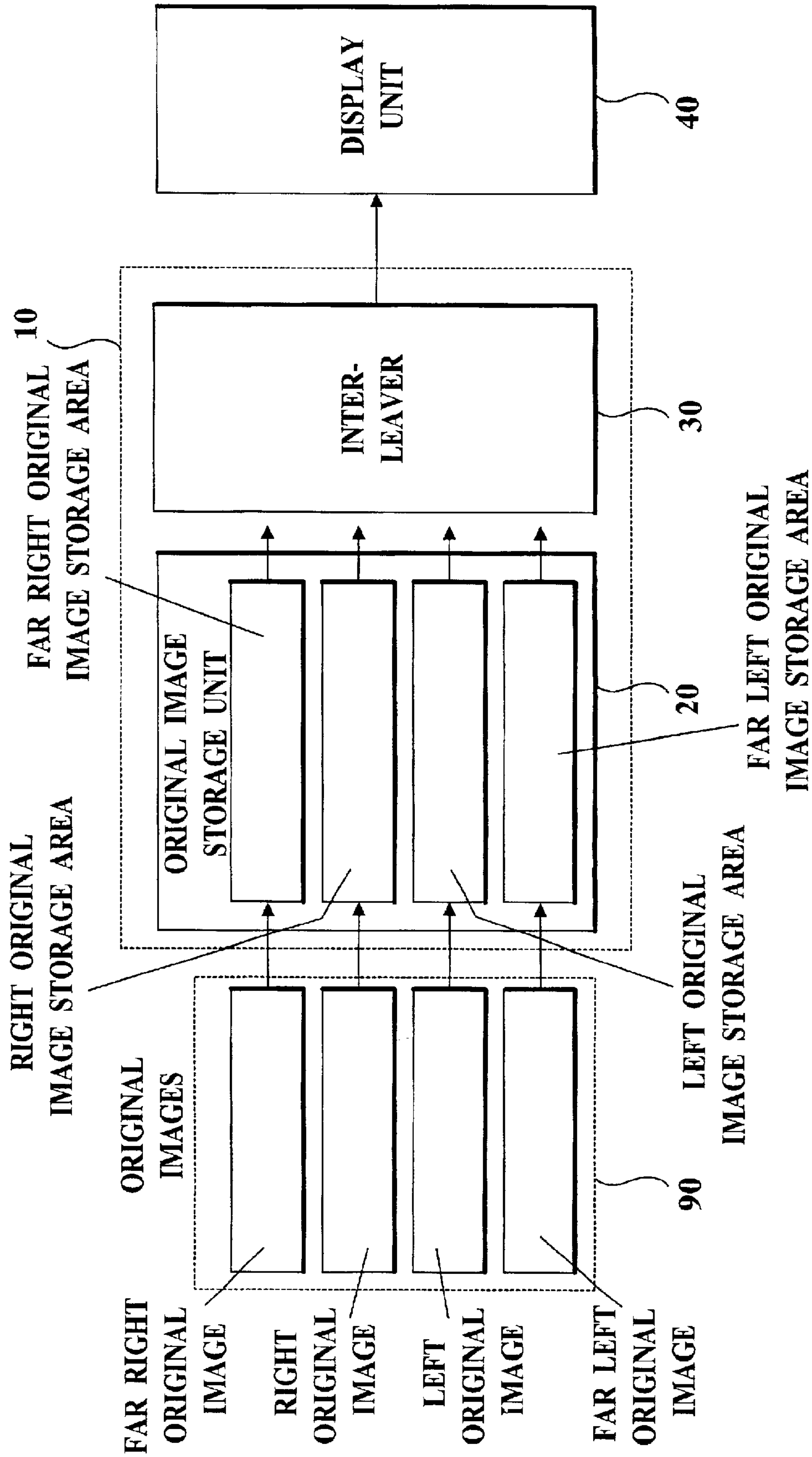
FIG. 3 is a schematic block diagram of a construction of a stereoscopic image generating apparatus 10 according to a first embodiment.

FIG. 3 is a block diagram showing a schematic construction of a stereoscopic image generating apparatus 10 according to a first embodiment to which the stereoscopic image generating apparatus of the present invention is applied. The stereoscopic image generating apparatus 10 generates stereoscopic images on the basis of original images inputted to the stereoscopic image generating apparatus 10 from the outside, and comprises an original image storage unit 20 that is a memory for storing inputted original images 90 therein and an interleaver 30 that is a dedicated circuit for generating a stereoscopic image. The generated stereoscopic images are displayed on a display unit 40 that is a four-eye Lenticular type of stereoscopic image display apparatus.

The original image storage unit 20 is a memory for storing original images 90 including a far right original image, a right original image, a left original image and a far left original image viewed from four view points, collectively inputted to the stereoscopic image generating apparatus 10 from the outside for every frame, for example, at intervals of 1/60 second per frame, and composed of a RAM or the like.

Further, addresses at which the far right original image, the right original image, the left original image and the far left original image are stored respectively are previously predetermined in the original image storage unit 20. Therefore, the original images 90 inputted to the stereoscopic image generating apparatus 10 for every frame are restored or stored in storage areas of the original image storage unit 20 corresponding to the original images respectively. Accordingly, for example, in case of the far right original image, besides the area in which the far right original image is stored, the addresses in which data corresponding to sub pixels of the far right original images, more specifically, color data are stored are determined previously.

The interleaver 30 selects, that is, samples the sub pixel corresponding to each composed image sub pixel of the composed image to be displayed as the stereoscopic image among sub pixels of the original images 90 stored in the original image storage unit 20, interleaves in parallel, and thereby generates the stereoscopic image. Herein, the algorithm achievable of the parallel interleave will be indicated as follows. That is, the original images 90 inputted to the stereoscopic image generating apparatus 10 from the outside are stored in the predetermined addresses of the predetermined storage areas of the original image storage unit 20. Therefore, color data of sub pixels of the original images 90 read out by the interleaver 30, more exactly, the original images 90 as an object of sampling are stored in the fixed addresses. For example, image data corresponding to the specified sub pixels of the far right original image 2-3, that is, color data are always stored in the fixed addresses. Accordingly, the interleaver 30 reads out image data, that is, color data from the addresses as an object mechanically, and thereby can perform the sampling when interleaving.

Herein, because the algorithm itself of interleaving including the sampling and so on, that is, the algorithm itself of generating the stereoscopic image has been known well in the above-described "3D Image-Processing Algorithms that Take Account of a Lenticular Array's Sampling Effect (3D Image Conference 1996)" or the like, the explanation thereof will be omitted. Further, the interleaver 30 is composed of a CPU (Central Processing Unit), an ASIC (Application Specific Integrated Circuit), a DSP (Digital Signal Processor) or the like, as a dedicated circuit to interleave.

The display unit 40 is a four-eye Lenticular system of stereoscopic image display apparatus comprising a Lenticular screen consisting of a liquid crystal display or the like.

The display unit 40 displays the stereoscopic image generated by the interleaver 30 thereon, and thereby displays the image that can be seen through the Lenticular screen stereoscopically thereon.

According to the above-described configuration, the original images 90 are inputted to the stereoscopic image generating apparatus 10 for every frame, the stereoscopic image generating apparatus 10 stores the inputted original images 90 in the predetermined storage areas of the original image storage unit 20, and the interleaver 30 interleaves the stored original images 90 in parallel. Thereby, the stereoscopic image is generated for every frame.

Figure 4:
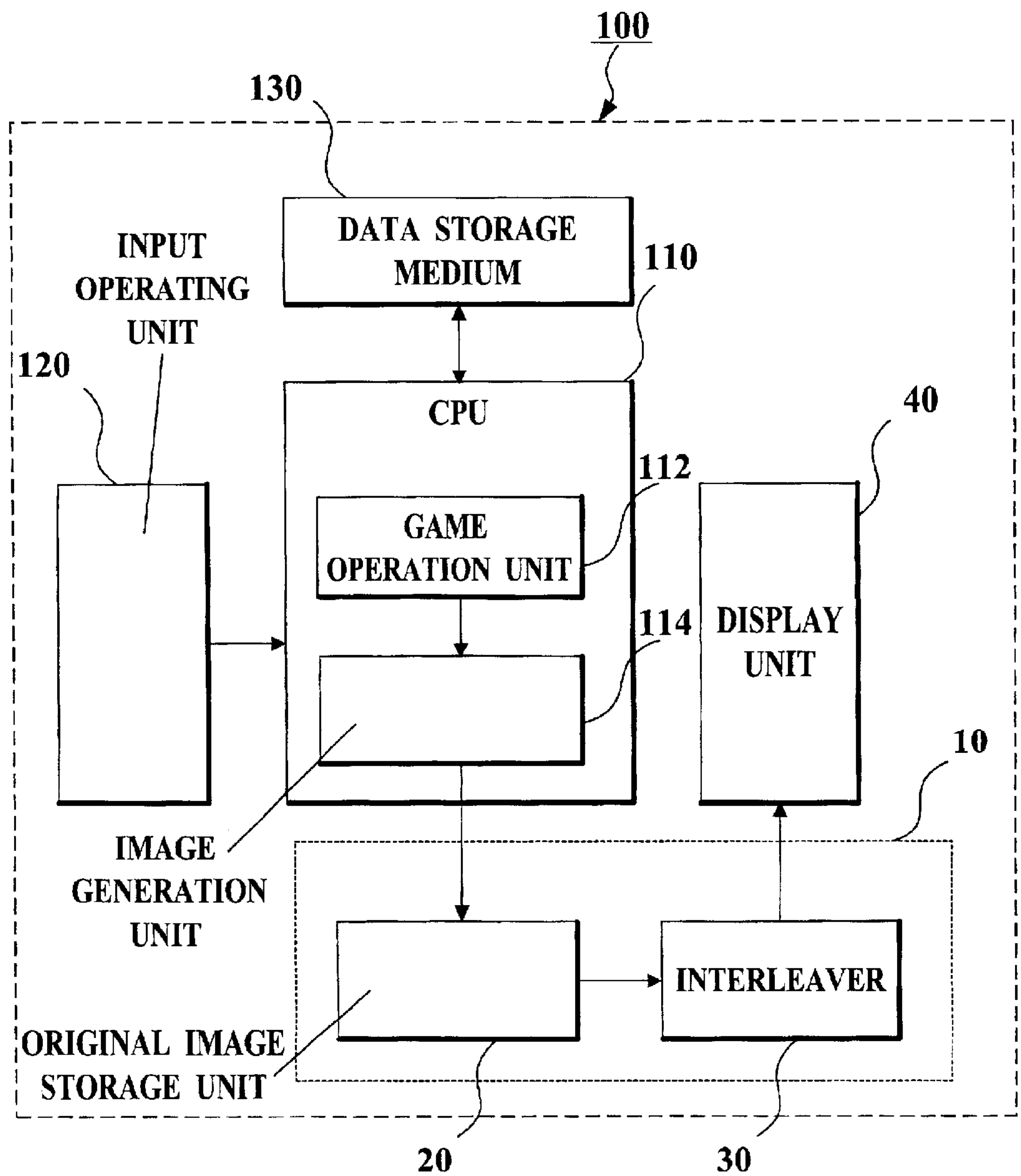
FIG. 4 is a functional block diagram of a game apparatus 100 comprising the stereoscopic image generating apparatus 10 according to the first embodiment.

Next, the game apparatus 100 having the stereoscopic image generating apparatus 10 will be explained with reference to FIG. 4. FIG. 4 is a block diagram showing an exemplary functional block of the game apparatus 100. In FIG. 4, the game apparatus 100 comprises an input operating unit 120, a CPU 110, a data storage medium 130, a stereoscopic image generating apparatus 10 and a display unit 40.

The input operating unit 120 is a device for inputting instructions to operate an own character of a game executed by the game apparatus 100, to start and stop the game and so on. The input operating unit 120 has the function achievable in input operating buttons and so on.

The data storage medium 130 stores a game program of executing the game, a program of determining a position of a virtual camera for generating stereoscopic images, and so on, therein. The data storage medium 130 has the function achievable in hardware such as a CD-ROM, a memory, a hard disc or the like.

The CPU 110 mainly comprises a game operation unit 112 and an image generation unit 114. The CPU 110 has the function achievable in hardware such as a CISC (Complex Instruction Set Computer) type or a RISC (Reduced Instruction Set Computer) type of CPU, a DSP, a dedicated IC for reading in images, or the like.

The game operation unit 112 reads out the game program from the data storage medium 130 according to the operation instruction outputted from the input operating unit 120, and constructs a game space by executing the read game program. Further, the game operation unit 112 operates positions of the own character and opponent characters in the constructed game space and a position of the virtual camera in the game space according to the operation instruction outputted from the input operating unit 120, and executes the game. Therefore, the game operation unit 112 outputs various types of coordinate data in the game space to the image generation unit 114. According to the embodiment, the position of the virtual camera when the game operation unit 112 operates the position of the virtual camera in the game space is locations of four viewpoints. However, the game operation unit 112 may determine only the position of the virtual camera at one viewpoint, and provide a virtual camera at another viewpoint of the position moved a predetermined distance in the horizontal direction or the vertical direction from the position of the virtual camera at the one viewpoint determined in the game space.

The image generation unit 114 generates images according to the positions of the virtual cameras corresponding to four viewpoints when the various types of coordinate data in the game space are inputted from the game operation unit 112. Therefore, when the image generation unit 114 outputs the generated images as the original images 90 to the stereoscopic image generating apparatus 10, the original images 90 are stored in the original image storage unit 20 of the stereoscopic image generating apparatus 10.

According to the stereoscopic image generating apparatus 10, when the interleaver 30 performs the above-described processing on the basis of the original images 90 stored in the original image storage unit 20, generates the stereoscopic image, and thereby outputs the stereoscopic image to the display unit 40, the display unit 40 displays the stereoscopic image thereon. Herein, the processing of generating the original images 90 is a processing performed by the CPU 110, and the processing of generating the stereoscopic image on the generated original images 90 is a processing performed by the stereoscopic image generating apparatus 10. Accordingly, because it is enough that the CPU 110 performs until the processing of generating the original images 90, the CPU 110 is released from the processing of generating the stereoscopic image, and it is unnecessary that the CPU 110 accesses the memory storing the original images 90 therein. On the other hand, according to the stereoscopic image generating apparatus 10, because the original images 90 are generated for every frame by the CPU 110, the timing when all original images 90 corresponding to four viewpoints respectively are inputted become stable, and it is possible that the interleaver 30 generates the stereoscopic image stably.

Second Embodiment

Figure 5:
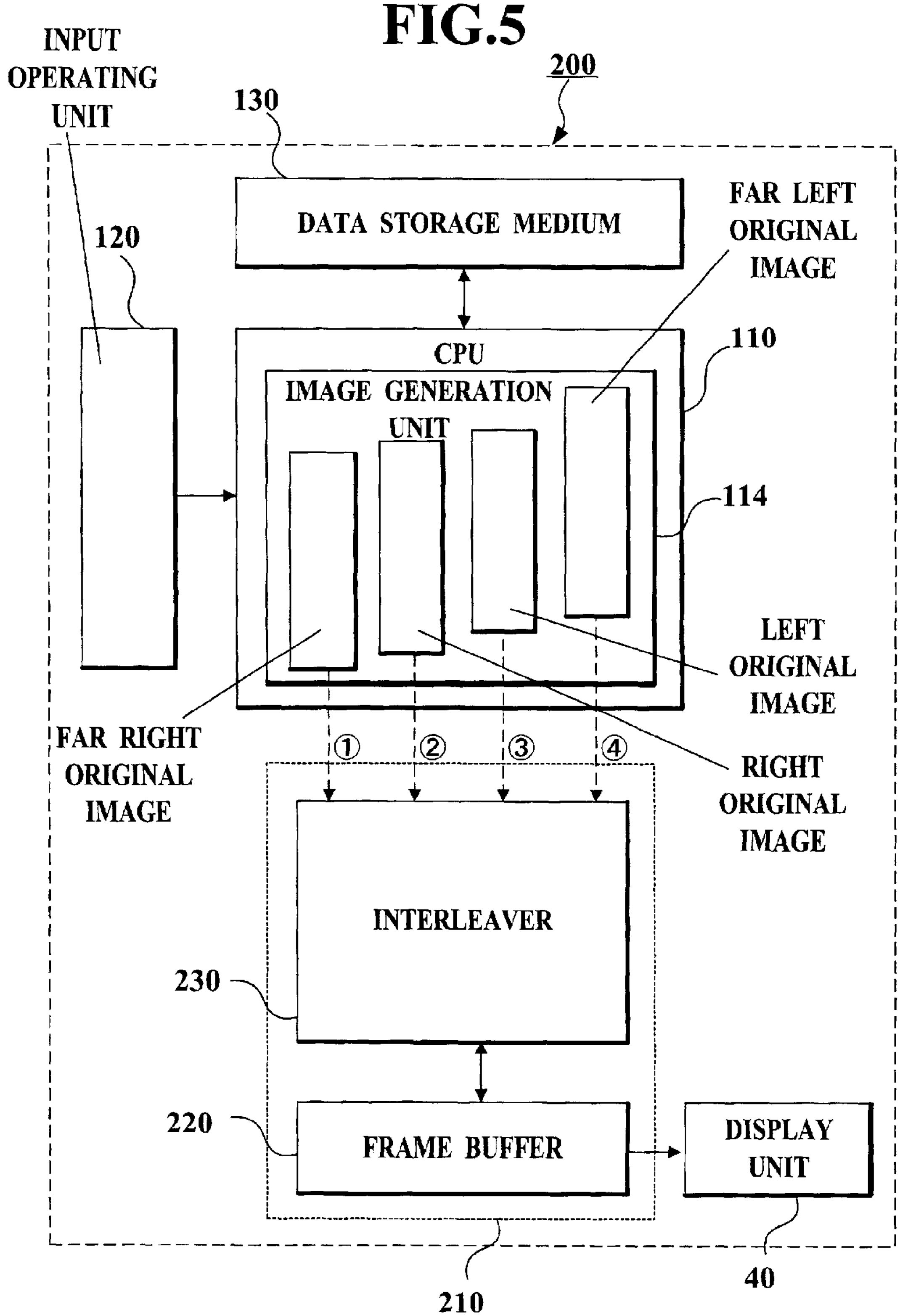
FIG. 5 is a functional block diagram of a game apparatus 200 comprising a stereoscopic image generating apparatus 210 according to a second embodiment.

FIG. 5 is a block diagram showing a schematic construction of a game apparatus 200 incorporating a stereoscopic image generating apparatus 210 according to a second embodiment to which the stereoscopic image generating apparatus of the present invention is applied. As shown in FIG. 5, in the game apparatus 200 the same reference numerals are attached to the same elements as those of the game apparatus 100 according to the first embodiment, and the explanations of the same elements will be omitted. Further, in the following explanation, the game apparatus 200 will be explained with reference to the same reference numerals.

First, the stereoscopic image generating apparatus 210 incorporated in the game apparatus 200 will be explained.

The stereoscopic image generating apparatus 210 is an apparatus realizable of generating the stereoscopic image in case the original images 90 at the viewpoints are inputted serially, that is, in series, that is, in case all the original images 90 are not completed at the same time. The stereoscopic image generating apparatus 210 comprises a frame buffer 220 and an interleaver 230.

The frame buffer 220 is a memory storing one frame of stereoscopic image therein, and the image completed as a stereoscopic image is displayed on the display unit 40. Herein, the "complete" image is used in contrast with the "incomplete" image, because there is a time to store the "incomplete" image in the frame buffer 220. Hereinafter, in order to make the explanation simple, the "composed image" stored in the frame buffer 220 and "completed" will be called the "stereoscopic image".

The interleaver 230, performs a series of processing of interleaving the original images inputted therein and the composed images stored in the frame buffer 220, and storing the result in the frame buffer 220, in order, continuously, and thereby generates the stereoscopic images. More specifically, the interleaver 230 performs a processing shown in FIG. 6, as the processing to one frame of image.

Figure 6:
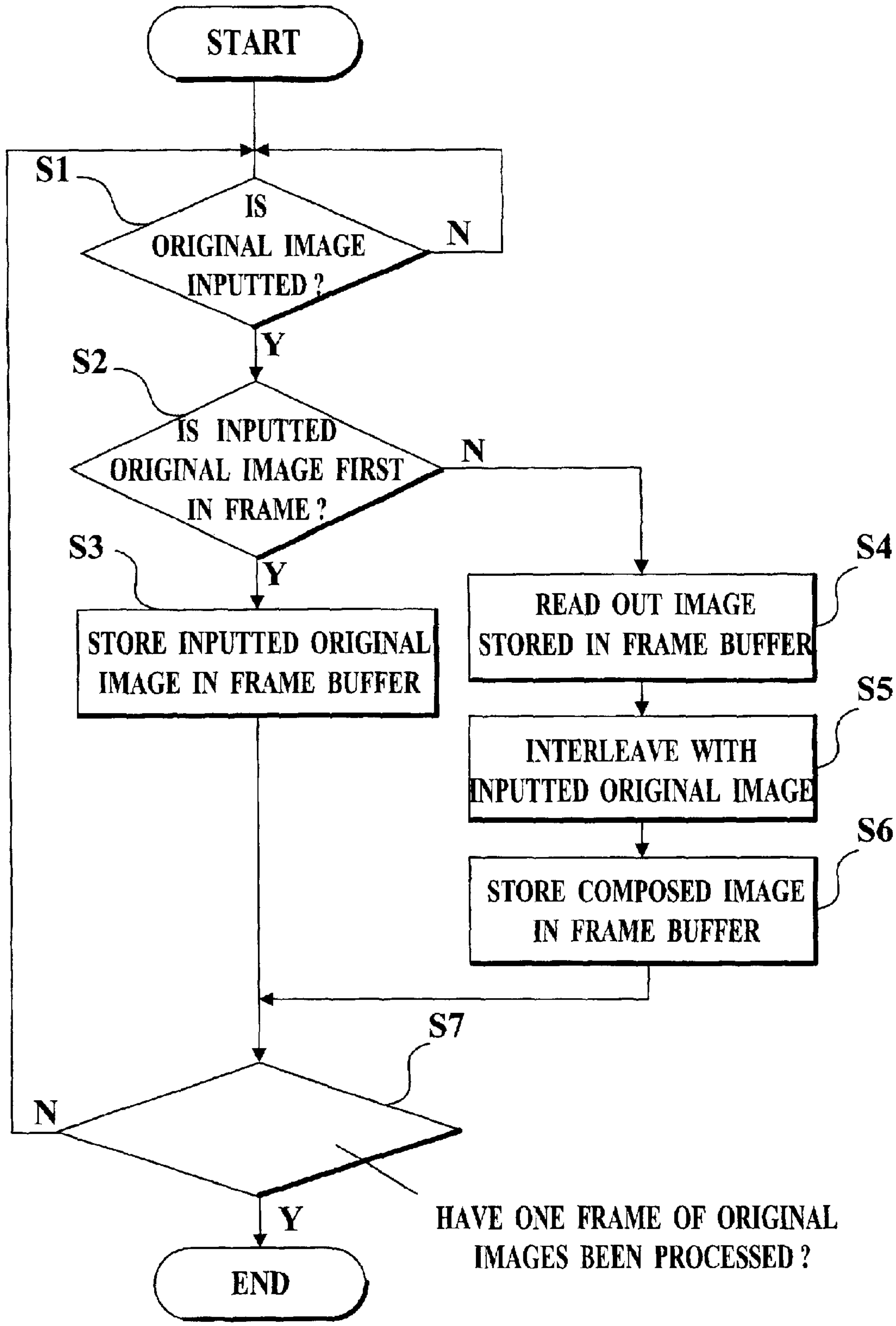
FIG. 6 is a flow chart showing a processing by an interleaver 230 of the stereoscopic image generating apparatus 210 according to the second embodiment.

That is, as shown in FIG. 6, first, when the interleaver 230 determines that the original image is inputted (Step S1; Y), the interleaver 230 determines whether the inputted original image is the first in the frame or not (Step S2). Then, when the interleaver 230 determines that the inputted original image is the first in the frame (Step S2; Y), the interleaver 230 restores the inputted original image in the frame buffer 220 (Step S3).

On the other hand, at the Step S2, when the interleaver 230 determines that the inputted original image is not the first in the frame (Step S2; N), the interleaver 230 reads out the image stored in the frame buffer 220 (Step S4), interleaves the read out image with the inputted original image (Step S5), and restores the interleaved composed image in the frame buffer 220 (Step S6).

After the processing at the Step S3 or the Step S6, the interleaver 230 determines whether one frame of original images, that is, four original images have been processed or not (Step S7). While the interleaver 230 determines that one frame of original images have not been processed (Step S7; N), the interleaver 230 carries out the processing from the Step Si to the Step S7 continuously. When the interleaver 230 determines that one frame of original images have been processed (Step S7; Y), the interleaver 230 ends the present processing.

According to the above-described processing, the stereoscopic image is stored in the frame buffer 220 finally.

Figure 7:
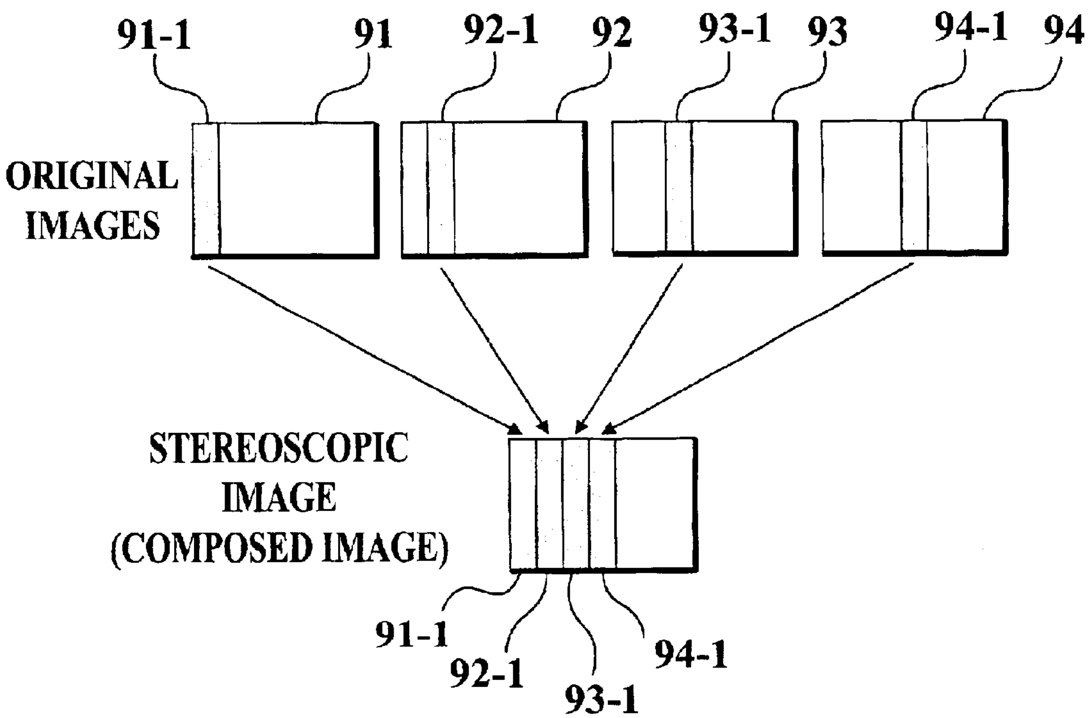
FIG. 7 is a schematic view for explaining the inter-leave.

Herein, although the interleave performed by the interleaver 230 at the Step S5, is obvious to persons having ordinary skills in the art in the above-described interleave algorithm, it will be again explained simply just to make sure. FIG. 7 is a schematic view for explaining the interleave, and in order to simplify the explanation, shows that the sub pixel is a vertical stripe and the stereoscopic image is constructed only by arranging color data of the sub pixels. In FIG. 7, the stereoscopic image is generated by ordinarily composing sub pixels 91-1, 92-1, 93-1, 94-1 and so on, sampled among a plurality of sub pixels of original images 91, 92, 93 and 94.

Accordingly, in each original image, the sub pixel used as the stereoscopic image is determined previously. That is, at the Step S5 in FIG. 6, because the interleaver 230 determines the sub pixel as an object of sampling according to the original image is any one of the far eight original image, the right original image, the left original image, and the far left original image, it is possible that the interleaver 230 interleaves.

Next, the game apparatus 200 incorporating the above-described stereoscopic image generating apparatus according to the second embodiment will be explained. Although the CPU 110, the input operating unit 120, the data storage unit 130 and the display unit 40 constituting the game apparatus 200 are the almost same as the corresponding units of the game apparatus 100 according to the first embodiment, the processing performed by the CPU 110 is a little different from the processing according to the first embodiment.

That is, because it is unnecessary that the image generation unit 114 of the CPU 110 generates the far right original image, the right original image, the left original image, and the far left original image, at the same time, the image generation unit 114 outputs the original images to the stereoscopic image generating apparatus 210 in generating order. Then, the stereoscopic image generating apparatus 210 interleaves in order on the basis of the inputted original images, and outputs the composed image stored in the frame buffer 220, that is, the stereoscopic image to the display unit 40, when interleaving with all original images of one frame.

Therefore, in the game apparatus 200, as well as the case according to the first embodiment, the processing of generating the original images and the processing of generating the stereoscopic image can be distributed, and further, according to the second embodiment, the parallel processing of generating images, such as a pipeline processing can be carried out. That is, in FIG. 5, for example, it will be explained that the image generation unit 114 generates the far right original image, the right original image, the left original image and the far left original image in order (① to ④). When the right original image is generated by the image generation unit 114 and outputted to the interleaver 230 (②), while the interleaver 230 interleaves the images stored in the frame buffer 220 with the right original image, the image generation unit 114 can generate the left original image.

In other words, because the interleaver 230 performs the processing of generating the composed image first on the basis of the inputted original images without waiting for all original images outputted from the image generation unit 114 to be complete, it is possible to reduce the time the interleaver 230 waits to perform the processing and to shorten the time of generating the stereoscopic image.

According to the second embodiment, it is unnecessary to say that the stereoscopic image generating apparatus 210 does not need a memory having a capacity storing all original images therein.

Although the first embodiment and the second embodiment to which the present invention is applied have been explained, it should also be understood that the present invention is not limited to the above-described embodiment. For example, the game apparatuses 100 and 200 may be applied to any one of a consumer game machine, a portable game machine and an arcade game machine, or, for example, a three-dimensional CAD (Computer Aided Design) system which can be applied to a stereoscopic image generating apparatus or the like of a walk-through model.

Further, as the display unit 40, the present invention can be applied not only to a multi-eye stereoscopic system and a compound-eye stereoscopic system besides a four-eye stereoscopic system but also to another stereoscopic system which needs to interleave when generating a stereoscopic image, for example, a parallax barrier stereoscopic system.

Further, although it has been explained that a color display apparatus is used as the display unit 40 according to the above-described embodiment, a black and white display apparatus may be used as the display unit 40. In the case, the interleaver interleaves not for every sub pixel but for every pixel.

INDUSTRIAL APPLICABILITY

According to the present invention, in the stereoscopic image generating apparatus, it is possible to generate the stereoscopic image for every frame at a real time, and to realize the display of the stereoscopic image as a dynamic image. That is, because it is possible to realize storing original images and interleaving the original images like an assembly-line operation, it is possible to lower the frequency of access to the memory. Further, it is possible to generate the stereoscopic image by interleaving the original images in order of input even if all plurality of original images are not completed. Further, according to the game apparatus incorporating the stereoscopic image generating apparatus therein, because it is enough that the stereoscopic image generating apparatus generates the stereoscopic image and the game apparatus executes the game and generates the game image, it is possible to distribute and perform the processing in parallel. Consequently, it is possible to perform the processing of the stereoscopic image with higher speed, and to reduce the processing time thereof. Accordingly, the present invention is suited for a stereoscopic image generating apparatus for generating stereoscopic images to be displayed on a n-eye type of stereoscopic image display apparatus, for every frame, and displaying dynamic images on the stereoscopic image display apparatus, and a game apparatus comprising the stereoscopic image generating apparatus.

What is claimed is:

1. A game apparatus, comprising:

a game image generating section for generating n viewing images for every frame when a game space is viewed from n viewpoints, in order to enable a player to recognize the game space three-dimensionally by use of binocular parallax;

an input image storage memory comprising storage areas for storing the n viewing images exclusively by each viewing image, respectively, the viewing images being generated by the game image generating section for every frame;

an interleaver for generating the stereoscopic image to be displayed on an n-type of stereoscopic image display apparatus for every frame by sampling image data which are stored in a predetermined storage address of the storage areas, from the storage areas of the input image storage memory for every frame, respectively and by interleaving the viewing images in parallel; and a display control section for renewing display of an image to enable the player to recognize the game space three-dimensionally by use of binocular parallax for every frame to control display of a three-dimensional dynamic image in the game space by taking control as to display the stereoscopic image generated by the interleaver on the stereoscopic image display apparatus.

2. The apparatus of claim 1, wherein n is at least 3.

3. An apparatus, comprising:

a single frame buffer for storing a frame of stereoscopic images therein;

a viewing image generating section for sequentially generating n viewing images for enabling a user to recognize a three-dimensional image using binocular parallax and generating the n viewing images for every frame;

a determining section for determining whether each of the viewing images sequentially generated by the viewing image generating section is a first viewing image for the frame;

a first viewing image storing section for storing the viewing image in the frame buffer by overwriting in response to the determining section determining that the viewing image is the first viewing image;

an interleaving storing section for interleaving the viewing image and an image stored in the frame buffer and for storing an interleaved image in the frame buffer by overwriting in response to the determining section determining that the viewing image is not the first viewing image; and a display control section for determining whether the image stored in the frame buffer is an image made by interleaving the n viewing images, and for renewing display for every frame by taking control so as to renew display of an n-eye type of stereoscopic image display apparatus by the image stored in the frame buffer in conjunction with the image made by interleaving the n viewing images, to enable the user to recognize a three-dimensional dynamic image by use of binocular parallax.

4. The apparatus of claim 3, wherein n is at least 3.

5. A game apparatus, comprising:

a single frame buffer for storing a frame of stereoscopic images therein;

a game image generating section for sequentially generating n viewing images when a game space is viewed from n viewpoints and for generating the n viewing images for every frame in order to enable a player to recognize the game space three-dimensionally by use of binocular parallax;

a determining section for determining whether each of the viewing images sequentially generated by the game image generating section is a first viewing image for the frame;

a first viewing image storage section for storing the viewing image in the frame buffer by overwriting in response to the determining section determining that the viewing image is the first viewing image;

an interleaving storage section for interleaving the viewing image and an image stored in the frame buffer and for storing an interleaved image in the frame buffer by overwriting in response to the determining section determining that the viewing image is not the first viewing image; and a display control section for determining whether the image stored in the frame buffer is an image made by interleaving the n viewing images, and for renewing display of an image for enabling the player to recognize the game space three-dimensionally by use of binocular parallax for every frame by taking control so as to renew display of an n-eye type stereoscopic image display apparatus by the image stored in the frame buffer in response to the image made by interleaving the n viewing images, to control display of a three-dimensional dynamic image of the game space.

6. The apparatus of claim 5, wherein n is at least 3.

* * * * *